A. BONNET.
PNEUMATIC TIRE.
APPLICATION FILED MAY 20, 1908.
956,928.
Patented May 3, 1910.
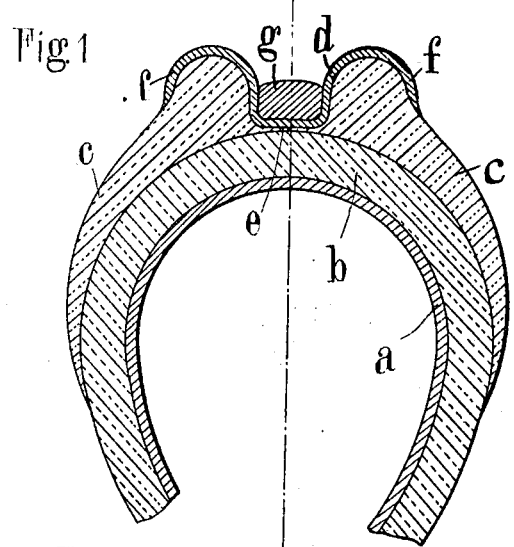
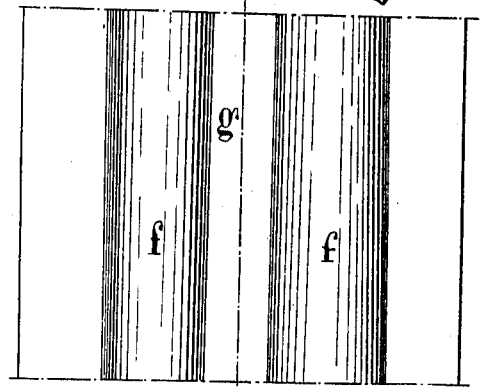
WITNESSES
INVENTOR
Adrien Bonnet
BY
ATTORNEYS

UNITED STATES PATENT OFFICE.

ADRIEN BONNET, OF PARIS, FRANCE.

PNEUMATIC TIRE.

956,928. Specification of Letters Patent. Patented May 3, 1910.

Application filed May 20, 1908. Serial No. 433,804.

*To all whom it may concern:*

Be it known that I, ADRIEN BONNET, a citizen of the Republic of France, and resident of Paris, France, have invented a new and useful Pneumatic Tire, which improvement is fully set forth in the following specification.

This invention relates to pneumatic tires and more particularly to the construction of outer covers for the pneumatic tires of vehicle wheels.

The cover according to this invention is chiefly characterized by the provision of a groove formed in a tread-band of cresent shaped section with which the tire is provided, in which groove is placed the U-shaped heel of a protecting band, the side-portions of which overlap the tread-band at the sides of the groove. The protecting band is secured in place by means such as a metal ring compressing the U-shaped heel in the groove, said ring, however, being located in the groove in such a manner that it does not contact with the ground. By the arrangement of the protecting band and ring in the manner stated the tire is fully protected against puncturing, heating, and bursting.

In the accompanying drawings, Figure 1 is a transverse section through a pneumatic tire showing the improved cover, and Fig. 2 is a top plan view of the same.

In the said drawing $a$ is the inner tube of the tire, $b$ the outer cover proper and $c$ the tread band of the cover. In the tread-band $c$ is formed in the central plane of the tire, a groove rounded off at the bottom, in which groove is arranged a protecting and tread band $d$ made of leather or other suitable material, plain, in one or more pieces. The band $d$ or the portions of the band, comprise a heel $e$ which fits into the groove and engages with the raised portions provided for the purpose of avoiding sliding in the longitudinal direction. The band $d$ is moreover, provided with two parallel tread surfaces $f$ which extend laterally, on the right and on the left hand side on the tread band. The said surfaces have the shape of the portions of the tread band which they cover. If the tread band forms, as in the construction illustrated, projecting portions at each side of the grooves, the surfaces $f$ are rounded off.

A metal circlet or ring $g$ which is placed into the heel of the band $d$, keeps the latter in place on the tire. The circlet $g$ is preferably a continuous ring. The circlet is put in place before inflating the inner tube, the tightening being brought about by the inflation. The thickness of the circlet $g$ is such that it never touches the ground. In this way, the transmission to the cover of heat which would be produced by the metal sliding on the ground, is avoided. On the contrary, the arrangement of the ring in the recessed groove produces a circulation, on the whole circumference of the tire, of a current of air which cools the cover just at the portion in contact with the road.

The construction of the cover described has the following advantages: 1. Punctures and bursting are practically impossible as the cover is protected in the center by the metal ring, and at the right and left hand side by the protecting band, the thickness and the strength of which can vary to suit the weight of the vehicles, the speed desired etc.; 2. Doing away with the heating of the cover and consequently of the inner tube, the tread band being independent of the said cover on which it does not act by friction, but simply by compression; 3. Great durability of the cover which is not in contact with the road and can be only slightly influenced by the effects of compression exercised by the band; 4. Facility and quickness of replacing the band which make it possible always to travel under the best conditions and with the maximum of safety; 5. Doing away with spare covers which are so cumbersome to carry and replacing them by a few bands of a small volume; 6. Side slipping is less to be feared, even with a plain band, since the two parallel tread surfaces are separated by a hollow; 7. More complete absorption of shocks due to inequalities on the roads and to obstacles, the arrangement of a groove necessarily requiring greater thickness than in usual covers.

Having thus described my invention I claim:

In a pneumatic tire, the combination of an inner tube, an outer cover for the inner tube, an inner tread-band of crescent-shaped cross-section and having a central annular groove in the outer face thereof, the face of said band being transversely curved adjacent to said groove, an outer leather tread-band secured to and conforming to the faces of said groove and the curved face adjacent thereto, and a circlet or ring having flattened inner, outer and side faces and fitting snugly in said groove, the depth of said groove being much greater than the depth of said circlet.

In testimony whereof I have signed this specification in the presence of two subscribing witnesses.

ADRIEN BONNET.

Witnesses:
EMILE LEDRET,
H. C. COXE.